(12) United States Patent
Wu

(10) Patent No.: US 8,974,127 B2
(45) Date of Patent: Mar. 10, 2015

(54) OPTICAL CONNECTOR CONNECTED BETWEEN ELECTRONIC DEVICE AND OPTICAL FIBER

(71) Applicant: Hon Hai Precision Industry Co., Ltd., New Taipei (TW)

(72) Inventor: Kai-Wen Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/931,777

(22) Filed: Jun. 28, 2013

(65) Prior Publication Data

US 2014/0212099 A1  Jul. 31, 2014

(30) Foreign Application Priority Data

Jan. 25, 2013 (TW) ............................. 102102821 A

(51) Int. Cl.
*G02B 6/43* (2006.01)
*G02B 6/42* (2006.01)

(52) U.S. Cl.
CPC .............. *G02B 6/428* (2013.01); *G02B 6/4206* (2013.01); *G02B 6/4246* (2013.01)

USPC ................................................ 385/93; 385/89

(58) Field of Classification Search
CPC ...... G02B 6/428; G02B 6/4274; G02B 6/4206
See application file for complete search history.

(56) References Cited

U.S. PATENT DOCUMENTS

| 6,953,291 | B2 * | 10/2005 | Liu | 385/94 |
| 7,198,412 | B2 * | 4/2007 | Hamasaki et al. | 385/88 |
| 2011/0158585 | A1 * | 6/2011 | Chang et al. | 385/33 |

* cited by examiner

*Primary Examiner* — Omar R Rojas

(74) *Attorney, Agent, or Firm* — Novak Druce Connolly Bove + Quigg LLP

(57) ABSTRACT

An optical connector includes a substrate, a photoelectric element, and a base. The substrate includes a bearing surface. The photoelectric element includes a base, at least one light emitter, and at least one light receiver. The base is positioned on the bearing surface and includes an installing surface substantially perpendicular to the bearing surface. The light emitters and the light receivers are positioned on the installing surface. The optical element includes at least two first lenses and at least two second lenses aligned with the first lenses. The light emitters and the light receivers are aligned with the first lenses.

9 Claims, 4 Drawing Sheets

OPTICAL CONNECTOR CONNECTED BETWEEN ELECTRONIC DEVICE AND OPTICAL FIBER

BACKGROUND

1. Technical Field

The present disclosure relates to optical connectors, and particularly to optical connectors having high light transmission efficiency in fiber optic cables.

2. Description of Related Art

Optical connectors are generally connected between an electronic device and an optical fiber, and include a photoelectric element and a lens element. The lens element covers the photoelectric element and includes a lens aligned with the photoelectric element and a reflector aligned with the lens. Misalignment between the reflector and the lens can occur, which affects light transmission efficiency of the optical connectors.

Therefore, it is desirable to provide an optical connector that can overcome the limitations described.

DETAILED DESCRIPTION

Figure 1:
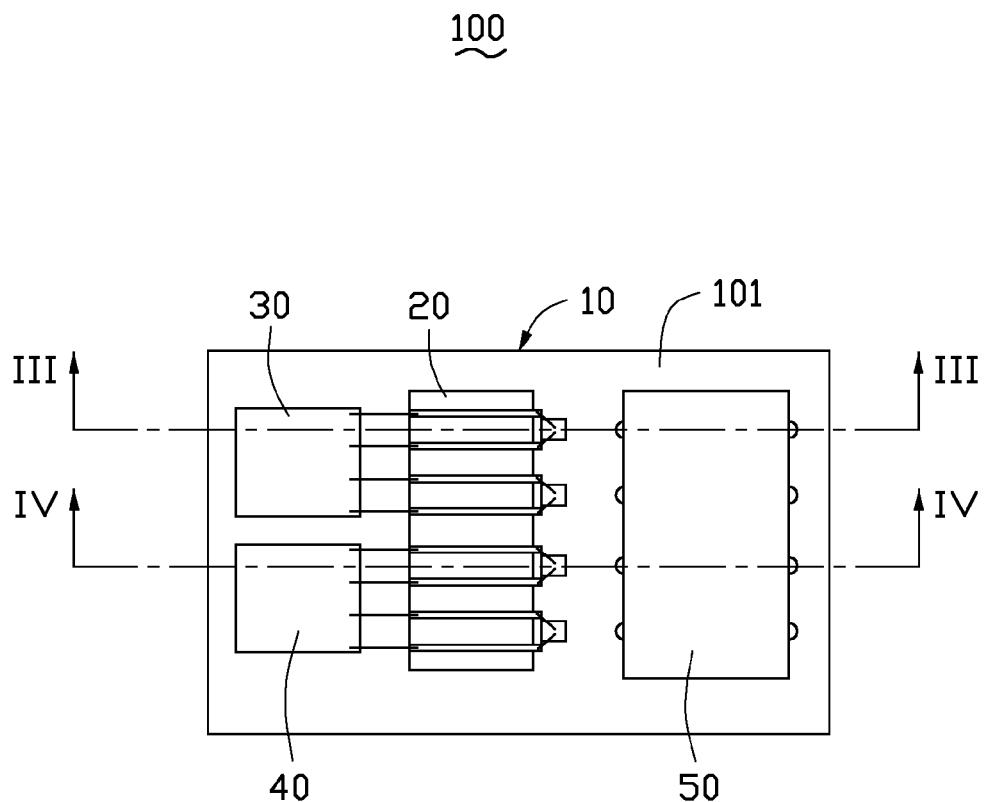
FIG. 1 is a vertical view of an optical connector in accordance with an exemplary embodiment.
Figure 2:
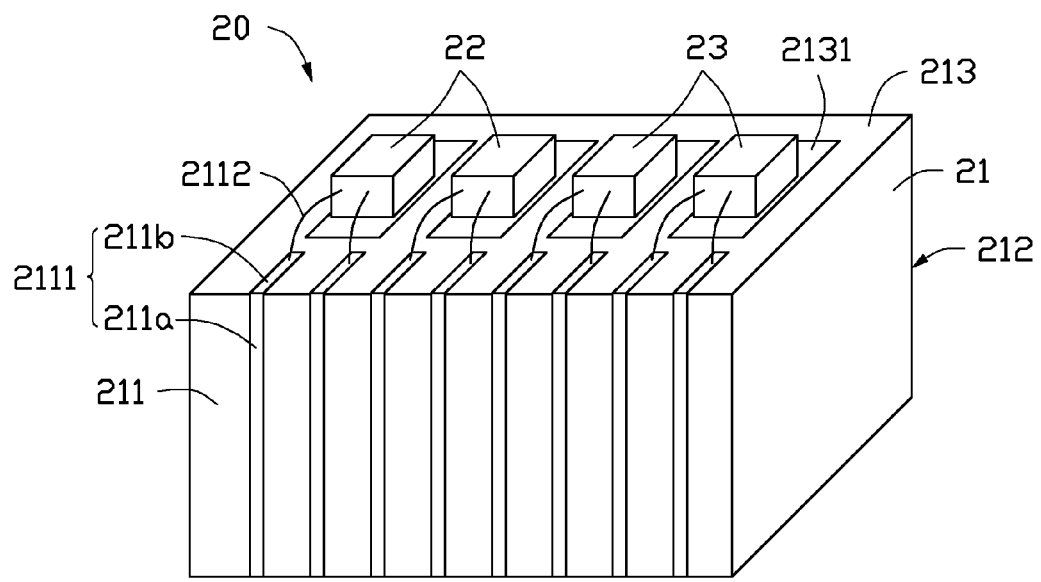
FIG. 2 is an isometric view of a photoelectric element of the optical connector of FIG. 1.

Embodiments of the disclosure will be described with reference to the drawings.

FIGS. 1-4 show an optical connector 100 according to an exemplary embodiment. The optical connector 100 includes a substrate 10, a photoelectric element 20, a first chip 30, a second chip 40, and an optical element 50. The optical connector 100 is connected between an electronic device and an optical fiber.

The substrate 10 is a printed circuit board and includes a bearing surface 101.

The photoelectric element 20 includes a base 21, at least one light emitter 22, and at least one light receiver 23. The base 21 is substantially rectangular and made of insulation material, such as ceramic or plastic. The base 21 includes a top surface 211, a bottom surface 212 opposite to the top surface 211, and an installing surface 213 substantially perpendicularly connected between the top surface 211 and the bottom surface 212.

The base 21 includes a number of conductive strips 2111 and at least two connecting pads 2131. Each of the conductive strips 2111 extends from the top surface 211 to the installing surface 213. The conductive strips 2111 are parallel to each other and are equidistantly spaced. Each of the conductive strips 2111 is L shaped and includes a first portion 211a attached to the top surface 211 and a second portion 211b attached to the installing surface 213. The first portion 211a extends along a direction substantially perpendicular to the installing surface 213, and the second portion 211b extends along a direction substantially perpendicular to the top surface 211. The connecting pads 2131 are positioned on the installing surface 213 and are spaced from each other. The conductive strips 2111 and the connecting pads 2131 are made of metal, such as copper, and are formed on the base 21 by electroplating.

In the embodiment, the base 21 includes eight conductive strips 2111 and four connecting pads 2131. Each of the connecting pads 2131 corresponds to two conductive strips 2111. The photoelectric element 20 includes two light emitters 22, such as light emitting diodes or laser diodes, and two light receivers 23, such as photodiodes. The light emitters 22 and the light receivers 23 are attached onto the connecting pads 2131. The connecting pads 2131 dissipate heat generated by the light emitters 22 and the light receivers 23. The two light emitters 22 are adjacent to each other, and the two light receivers 23 are adjacent to each other. Each of the light emitters 22 and the light receivers 23 is electronically connected to the second portions 211b of two conductive strips 2111 by two first wires 2112.

The photoelectric element 20 is positioned on the substrate 10, and the bottom surface 212 of the base 21 is secured to the bearing surface 101 with a glue 60.

The first chip 30 is supported on the bearing surface 101 and is electronically connected to the substrate 10. The first chip 30 is adjacent to the photoelectric element 20. The first chip 30 is electronically connected to the first portions 211a of the four conductive strips 2111 connected to the light emitters 22 by second wires 2113. The first chip 30 drives each light emitter 22 to convert electronic signals into their corresponding light rays.

The second chip 40 is supported on the bearing surface 101 and is electronically connected to the substrate 10. The second chip 40 is adjacent to the photoelectric element 20, and is positioned next to the first chip 30. The second chip 40 is connected to the first portions 211a of the four conductive strips 2111 connected to the light receivers 23 by the second wires 2113. The second chip 40 drives each light receiver 23 to convert received light rays into their corresponding electronic signals.

The optical element 50 is rectangular and is made of transparent material, such as plastic or glass. The optical element 50 includes an upper surface 51, a lower surface 52, a first side surface 53, and a second side surface 54. The lower surface 52 is opposite to the upper surface 51, and the second side surface 54 is opposite to the first side surface 53. The first side surface 53 and the second side surface 54 are substantially perpendicularly connected between the upper surface 51 and the lower surface 52. At least two first lenses 531 are formed on the first side surface 53, and at least two second lenses 541 are formed on the second side surface 54. The two first lenses 531 are aligned with the two second lenses 541. An optical axis A of the first lenses 531 and an optical axis O of the second lenses 541 are collinear and are parallel with the upper surface 51 and the lower surface 52. In the embodiment, the optical element 50 includes four first lenses 531 and four second lenses 541.

The optical element 50 is positioned on the substrate 10, and the lower surface 52 is secured to the bearing surface 101. The optical axes of the first lenses 531 and the second lenses 541 are parallel with the bearing surface 101. The optical element 50 is positioned away from the photoelectric element 20. The first side surface 53 faces the installing surface 213. The two light emitters 22 and the two light receivers 23 align with the four first lenses 531.

Figure 3:
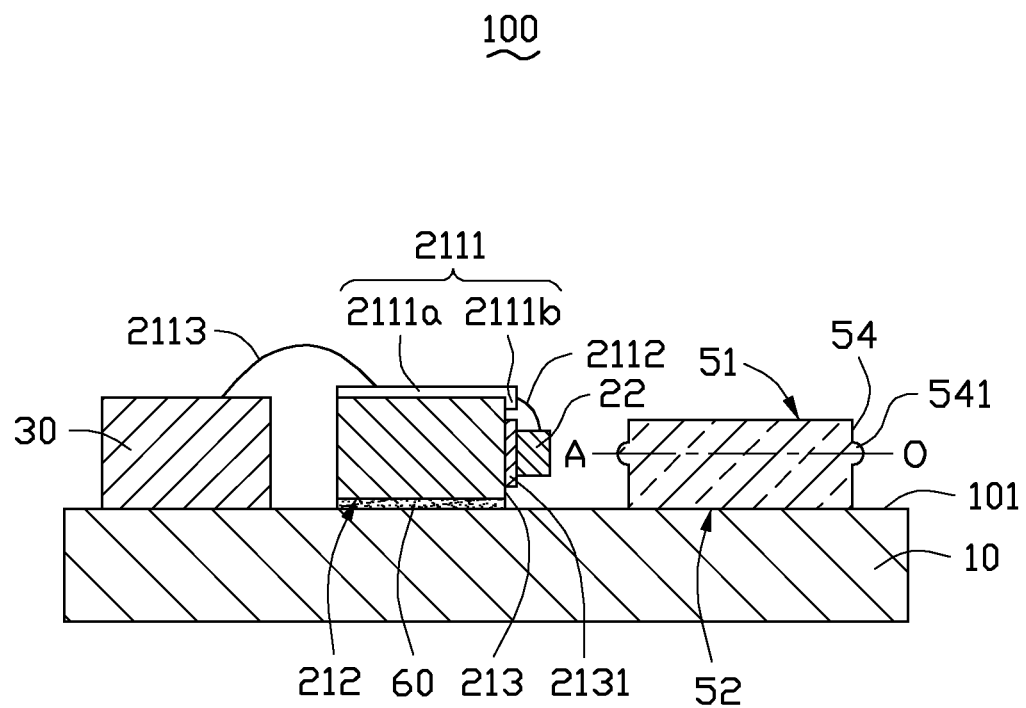
FIG. 3 is a cross-sectional view of the optical connector taken along a line III-III of FIG. 1.

Referring to FIG. 3, during the process of emitting the light rays, the first chip 30 drives the light emitters 22 to convert electronic signals into light rays, and the light rays are emitted into the first lenses 531 along a direction parallel to the bearing surface 101. The light rays then emit from the second lenses 541 after being converged by the second lenses 541.

Figure 4:
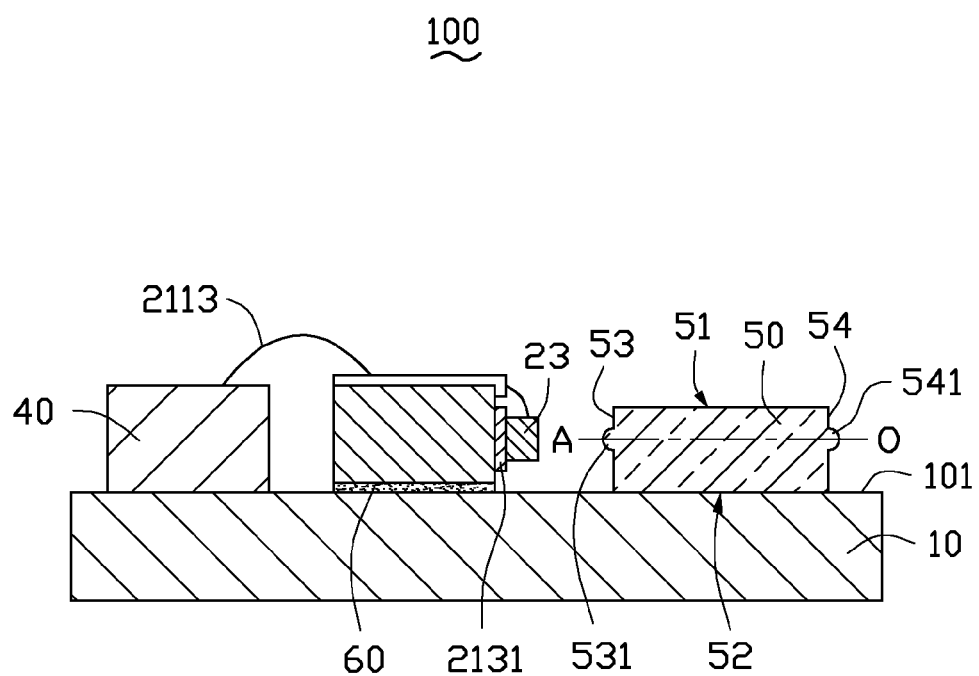
FIG. 4 is a cross-sectional view of the optical connector taken along a line IV-IV of FIG. 1.

Referring to FIG. 4, during the process of receiving light rays, the light rays enter into the optical element 50 from the second lenses 541. The light rays are emitted from the first lenses 531 after being converged by the first lenses 531 and are projected into the light receivers 23 along a direction parallel with the bearing surface 101. The second chip 40 drives each light receiver 23 to convert the light rays into their corresponding electronic signals.

In the embodiment, the light emitters 22 are aligned with the optical axes A and 0 so that the light rays emitted from the light emitters 22 are transmitted along a line. Likewise, the light receivers 23 are aligned with the optical axes A and 0 of the first lenses 531 and the second lenses 541 so that the light rays received into the optical element 50 are transmitted along a line. Therefore, the optical accuracy of the optical connector 100 is ensured.

In other embodiments, the number of the light emitters 22 and the light receivers 23 is three, such that the optical element 50 includes six first lenses 531 and six second lenses 541 accordingly.

In other embodiments, the first chip 30 and/or the second chip 40 are positioned on the base 21.

In other embodiments, the first chip 30 and/or the second chip 40 are connected to the light emitter 22 and the light receiver 23 via a circuit buried in the substrate 10 and the base 21.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An optical connector, comprising:
   a substrate comprising a bearing surface;
   a photoelectric element comprising:
      a base positioned on the bearing surface and comprising a top surface, a bottom surface opposite to the top surface and secured to the bearing surface, an installing surface substantially perpendicular to the bearing surface and substantially perpendicularly connected between the top surface and the bottom surface, and a plurality of conductive strips extending from the top surface to the installing surface;
      at least one light emitter positioned on the installing surface; and
      at least one light receiver positioned on the installing surface, each of the at least one light emitter and the at least one light receiver electronically connected to the conductive strips by first wires;
   an optical element positioned on the bearing surface, and comprising a first side surface and a second side surface opposite to the first side surface; at least two first lenses formed on the first side surface and at least two second lenses formed on the second side surface;
   a first chip positioned on the bearing surface and electronically connected to the substrate, the first chip electronically connected to the conductive strips connected to the at least one light emitter by second wires; and
   a second chip positioned on the bearing surface and electronically connected to the substrate, the second chip electronically connected to the conductive strips connected to the at least one light receiver by second wires;
   wherein an optical axis of the first lenses and an optical axis of the second lenses are collinear, and are parallel with the bearing surface; the at least one light emitter and the at least one light receiver are respectively aligned with the at least two first lenses.

2. The optical connector of claim 1, wherein the conductive strips are parallel to each other and are equidistantly spaced.

3. The optical connector of claim 2, wherein the first chip is configured for driving each light emitter to convert electronic signals into their corresponding light rays, and the second chip drives each light receiver to convert the light rays into their corresponding electronic signals.

4. The optical connector of claim 2, wherein the first chip and the second chip are adjacent to and spaced apart from the photoelectric element, the first chip is positioned next to the second chip, the first chip and the optical element are arranged at opposite sides of the base, and the second chip and the optical element are arranged at opposite sides of the base.

5. The optical connector of claim 4, wherein each of the conductive strips is substantially L shaped and comprises a first portion attached to the top surface and a second portion attached to the installing surface, each of the at least one light emitter and the at least one light receiver is electronically connected to the second portion by first wires, the first chip is electronically connected to the first portions of the conductive strips connected to the at least one light emitter by second wires, and the second chip is electronically connected to the first portions of the conductive strips connected to the at least one light receiver by second wires.

6. The optical connector of claim 5, wherein first portion extends along a direction substantially perpendicular to the installing surface, and the second portion extends along a direction substantially perpendicular to the top surface.

7. The optical connector of claim 6, wherein the base further comprises at least two connecting pads positioned on the installing surface and spaced from each other, and the at least one light emitter and the at least one light receiver are attached onto the connecting pads.

8. The optical connector of claim 7, wherein the bottom surface is secured to the bearing surface with a glue.

9. The optical connector of claim 7, wherein the conductive strips and the connecting pads are made of metal.

* * * * *